Figure 1:
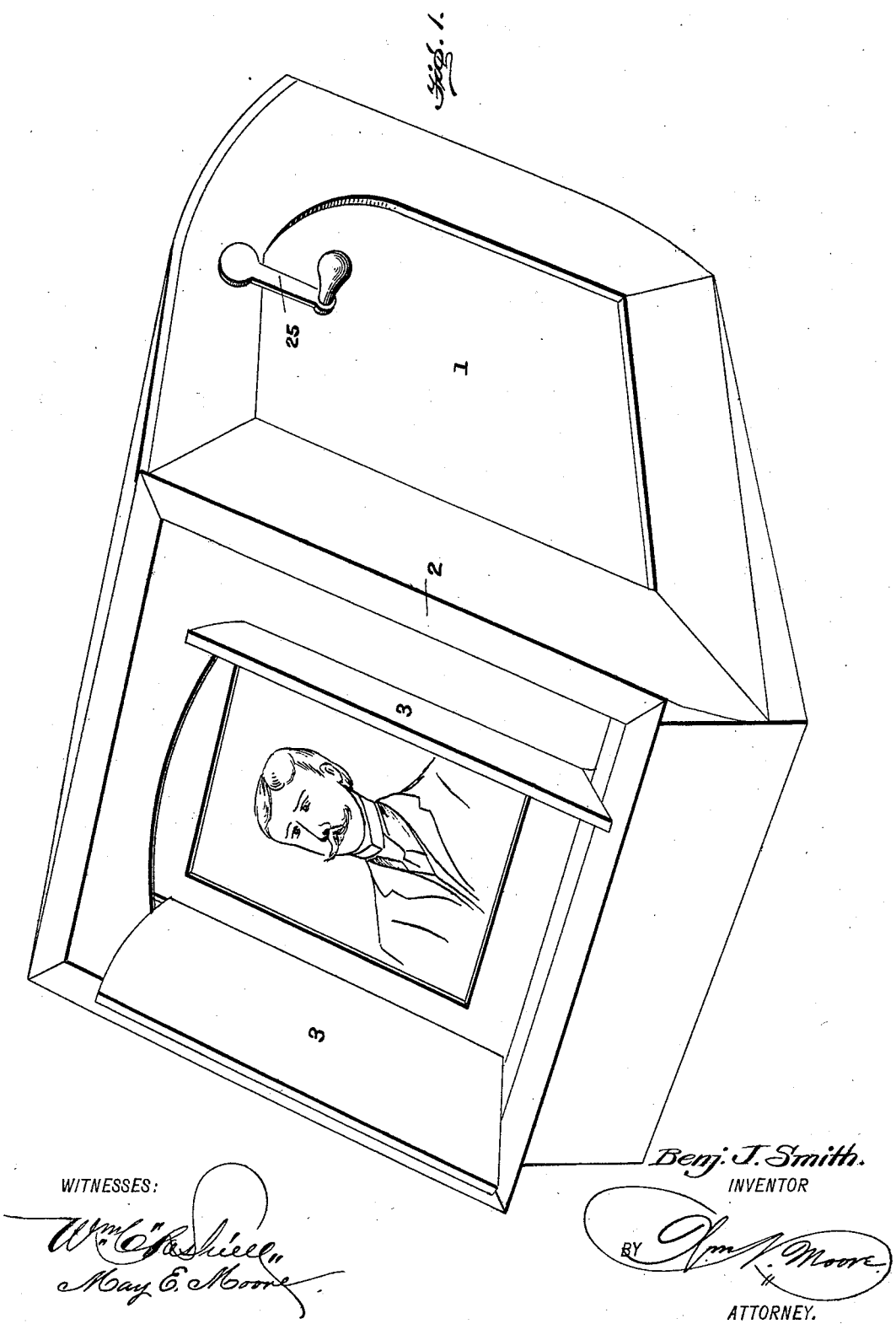

(No Model.)　　　　　　　　　　　　　　　　5 Sheets—Sheet 1.
B. J. SMITH.
AUTOMATIC DISPLAY DEVICE.

No. 519,483.　　　　　　　　　　Patented May 8, 1894.

WITNESSES:

Benj. J. Smith.
INVENTOR

BY

ATTORNEY.

(No Model.)  
B. J. SMITH.  
AUTOMATIC DISPLAY DEVICE.  
5 Sheets—Sheet 2.

No. 519,483. Patented May 8, 1894.

WITNESSES:

Benj. J. Smith.  
INVENTOR

BY  
ATTORNEY.

(No Model.) 5 Sheets—Sheet 3.
B. J. SMITH.
AUTOMATIC DISPLAY DEVICE.

No. 519,483. Patented May 8, 1894.

WITNESSES:

Benj. J. Smith
INVENTOR

ATTORNEY.

(No Model.) 5 Sheets—Sheet 4.

B. J. SMITH.
AUTOMATIC DISPLAY DEVICE.

No. 519,483. Patented May 8, 1894.

WITNESSES:

Benj. J. Smith,
INVENTOR

ATTORNEY.

(No Model.) 5 Sheets—Sheet 5.
B. J. SMITH.
AUTOMATIC DISPLAY DEVICE.
No. 519,483. Patented May 8, 1894.
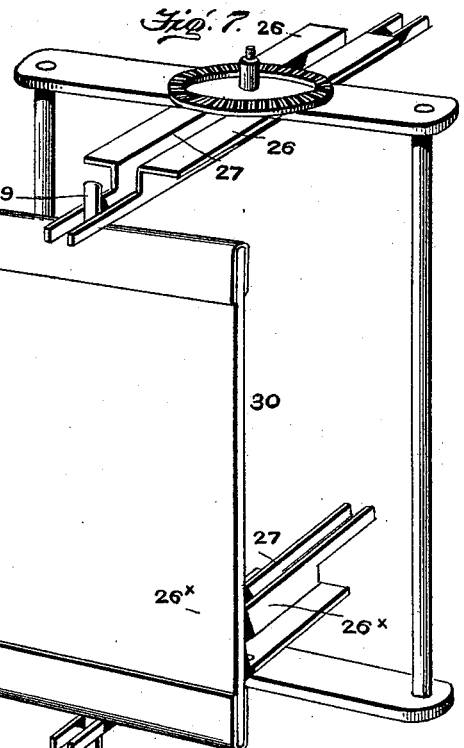
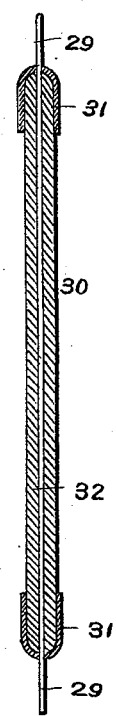
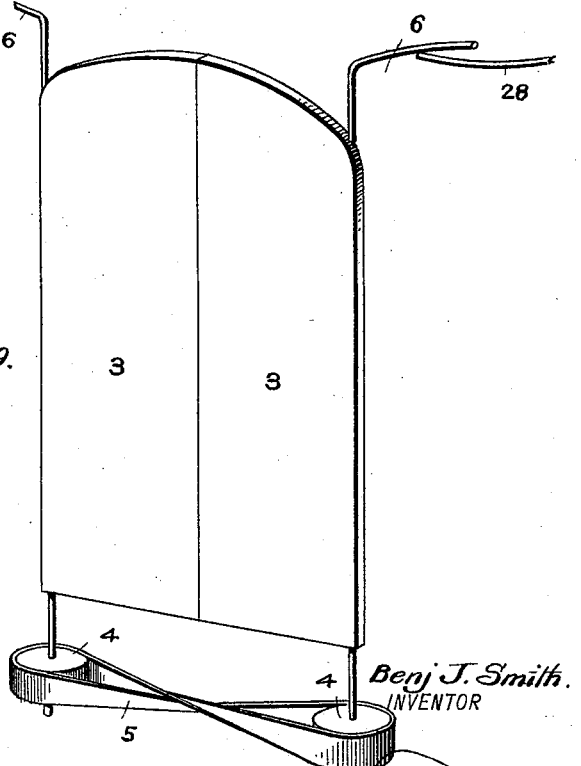

UNITED STATES PATENT OFFICE.

BENJAMIN J. SMITH, OF POTTSVILLE, PENNSYLVANIA.

AUTOMATIC DISPLAY DEVICE.

SPECIFICATION forming part of Letters Patent No. 519,483, dated May 8, 1894.

Application filed January 28, 1893. Serial No. 459,941. (No model.)

*To all whom it may concern:*

Be it known that I, BENJAMIN J. SMITH, a citizen of the United States, residing at Pottsville, in the county of Schuylkill and State of Pennsylvania, have invented certain new and useful Improvements in Automatic Display Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention is a novel and improved automatic device for displaying or exhibiting photographs, samples, advertisements or for indicating stations as may be desired, and one object of my invention is the provision of a device which may be operated manually or by power and which will have a suitable displaying or sight opening and a door or doors which will be automatically and at regular intervals opened to display or exhibit the desired object and the doors closed and the operation successively repeated whereby a device is provided which will be attractive and efficient for displaying, indicating or advertising as desired.

Another object of my invention is the provision of a device of the character and for the purpose named which will permit easy access to all the parts for the purpose of changing the signs, pictures or the like and which will be of any desired size and capacity according to the purpose for which it is employed.

Another object of my invention is the provision of a device which will be compact and not occupy a great amount of space; which will be of ornamental and attractive appearance and which will withstand rough usage and therefore be durable.

Another object of my invention is the provision of a displaying or exhibiting device which will be reliable and efficient in operation and will not easily get out of order and which can be produced at a comparatively low price thus rendering the improvement practical and economical.

To attain the desired objects the invention consists of an automatic displaying or exhibiting device embodying novel features of construction and combination of parts as will be disclosed herein.

In order that the construction, operation and advantages of my invention may be readily understood and appreciated I have illustrated my device in detail in the accompanying drawings.

Figure 2:
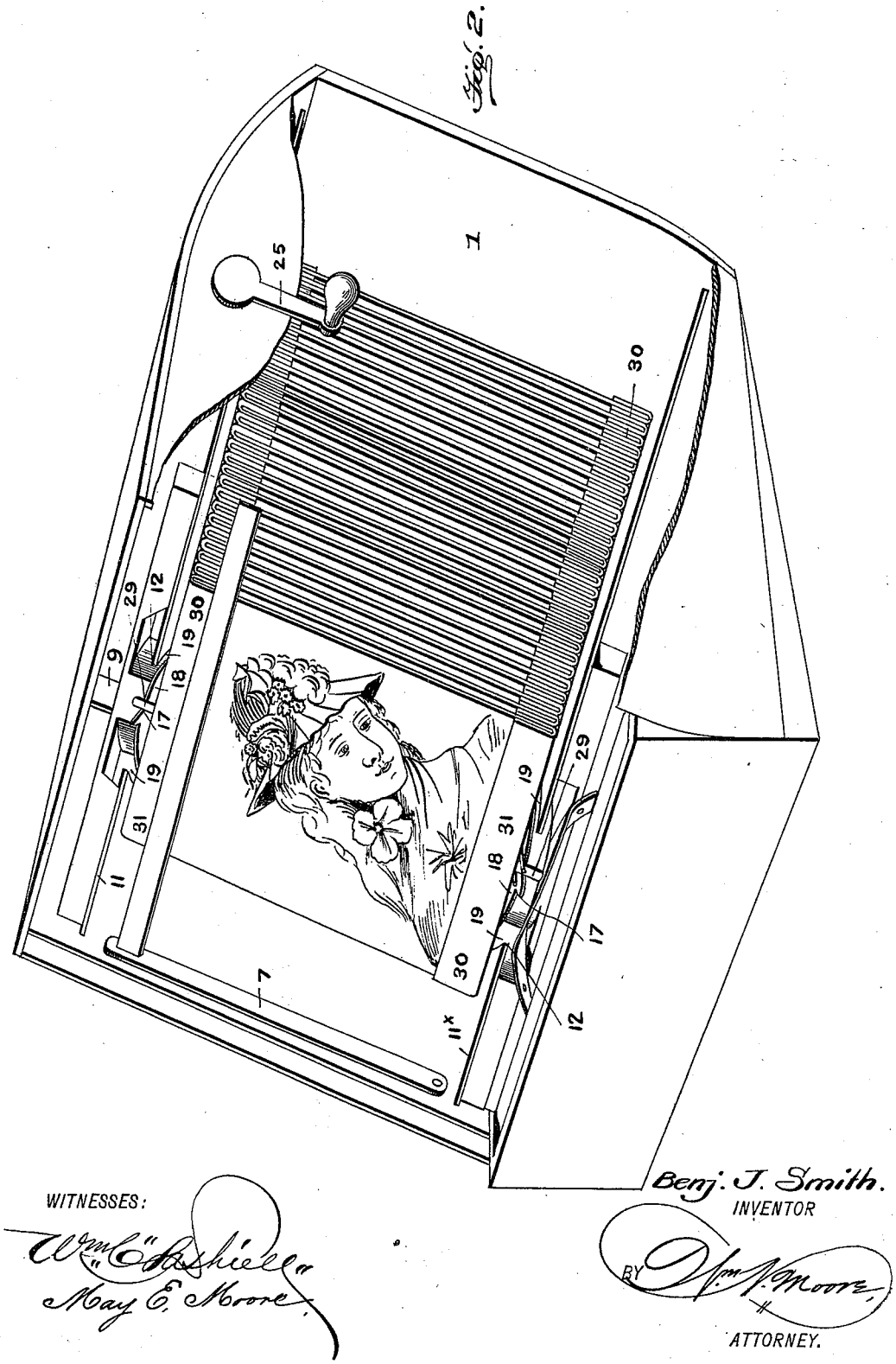
Figure 3:
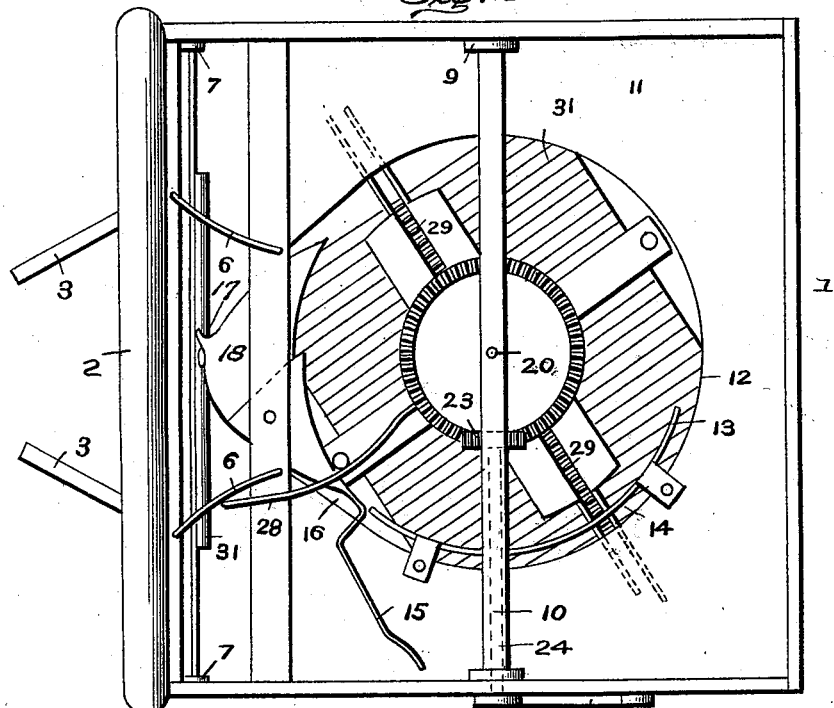
Figure 4:
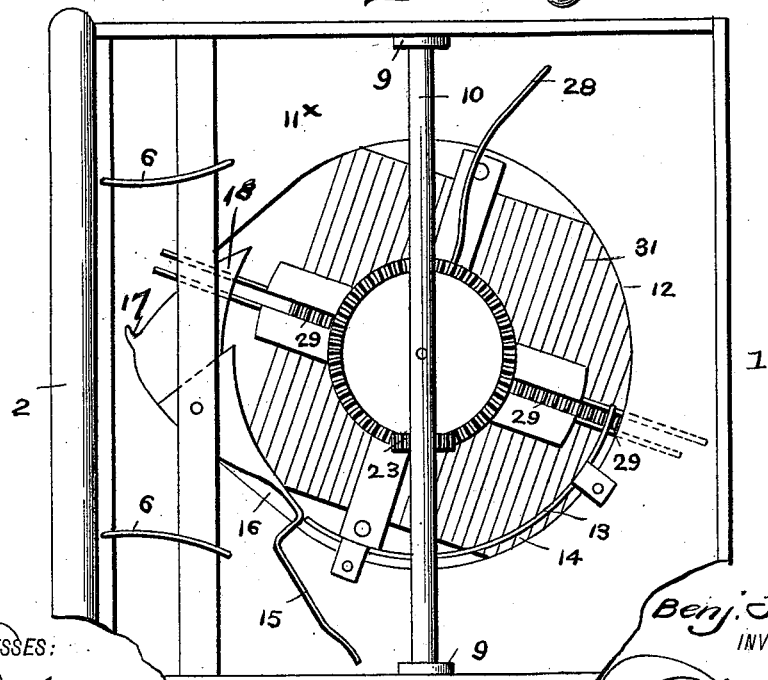
Figure 5:
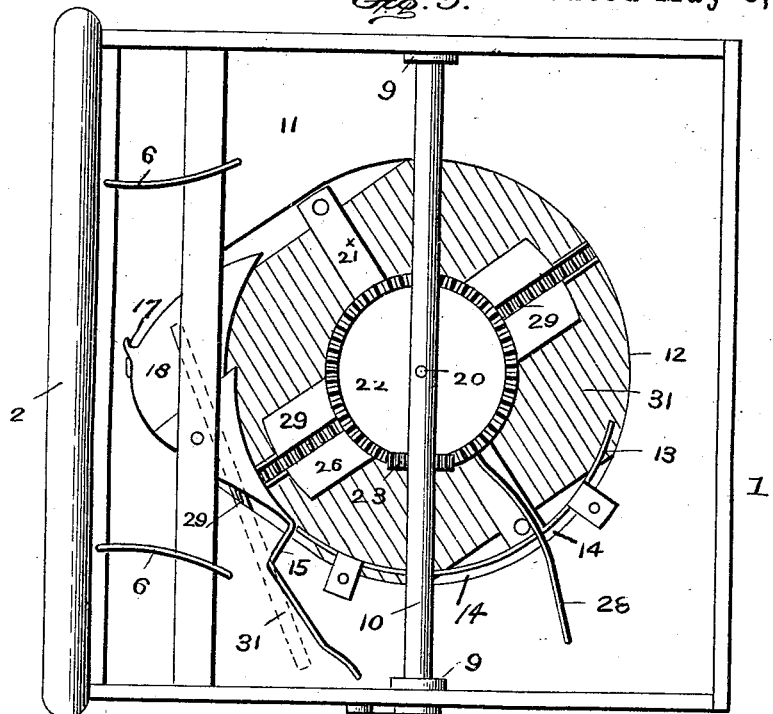
Figure 6:
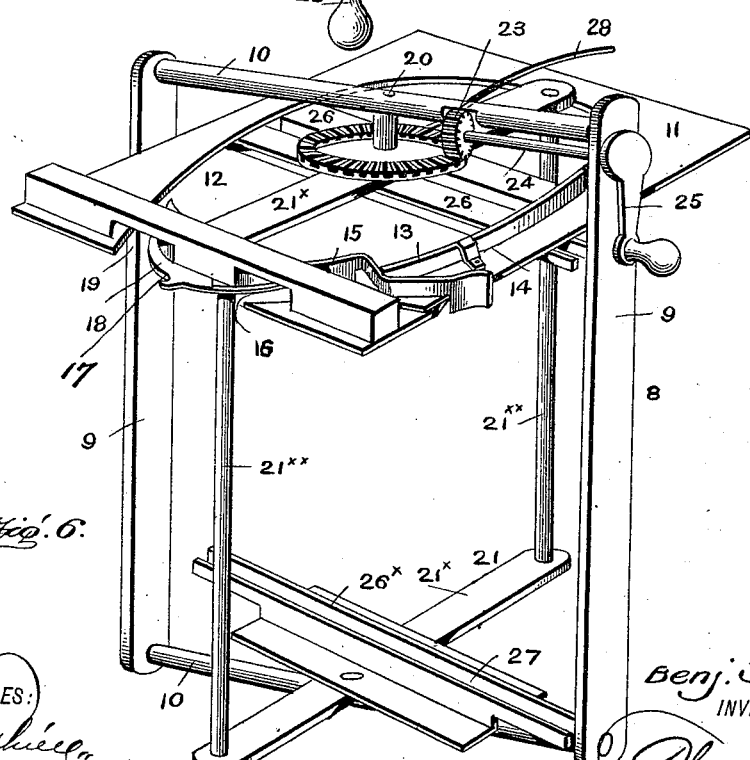

Figure 1 represents a perspective view of the device with the doors open and exhibiting a photograph to clearly illustrate the general purpose of the invention. Fig. 2 represents a similar view with the front of the casing removed and a photograph in the position to be displayed. Fig. 3 represents a top plan view of the device with the parts in the position they assume when the doors are being opened. Fig. 4 represents a plan view with the parts in proper position when one of the display frames is being introduced by the guide into the guiding channel or way. Fig. 5 represents a similar view with the display frame passing behind the pivoted guide into position to be displayed and the contiguous or adjacent frame being separated. Fig. 6 represents a perspective view of the frame and guides and the revolving carrier mounted therein with the driving or operating mechanism. Fig. 7 represents a perspective view of the revolving carrier and display frames detached to clearly illustrate how the frames are mounted. Fig. 8 represents a detail view of one of the display frames, and Fig. 9 represents a detail view of the doors and mechanism for opening and closing them.

Referring by numerals to the drawings in which similar numerals denote corresponding parts in all the figures of the drawings—the numeral 1 designates the casing or housing of my automatic display or exhibiting device which is of the proper shape and size for the purpose and has the open front in which is placed the frame 2, in which is mounted the doors 3, having the lower ends extended and carrying rollers 4, around which passes a band or belt 5, and each of the doors have at the upper outer corner an arm 6 adapted to be struck by proper mechanism for opening and closing the doors automatically. From this construction it will be seen that the doors are connected to open and close together and when the arm on one door is struck the doors will both open and when the other arm is struck the doors will be closed and the mechanism for opening or closing the doors will be described. Immediately in rear of the doors is the pivoted bail or yoke 7 which can be moved outward to permit the insertion or removal of the display racks or frames and serves when in normal condition as a support for the frames.

In the casing or housing is mounted the frame 8, which consists of the side pieces 9, the cross bar or connecting piece 10, and the upper and lower sections 11 and $11^\times$, each provided with a circular guide or way 12, and the sections are each provided on one side with the curved or segmental guide strips 13, which provide the ways 14, and the sections are further provided with the pivoted guide strips or plates 15, which form the continuation ways 16 in line with ways 14 which lead to the front portion of the casing, where the notches 17 are provided on the fixed plates 18, which are arranged to form a continuation way 19, the ways 14, 16 and 19 thus as will be seen forming a continuous passage or way from one part of the large circular openings to the front of the casing in the form of a segment or arc.

Mounted in the cross-bars 10 of the frame 8, are the studs or journals 20 of the frame 21, consisting of the two transverse pieces $21^\times$ and the two side or vertical pieces $21^{\times\times}$, forming an open rectangular frame adapted to be revolved by means of the gear wheel 22 carried by the frame and the pinion 23 carried by the frame 8, on the shaft 24, which extends out from the frame and operated by a crank 25, or by other means as may be desirable and convenient. To each of the cross-pieces $21^\times$ on the inner faces and at right angles to said cross-pieces are secured the tracks or strips 26 and $26^\times$ forming guides or channels 27, and the strips extend across and beyond the circular openings of the sections 11 and $11^\times$, and the strips or tracks $26^\times$ are a trifle longer than the strips 26, the purpose of which will appear. From this construction it will be seen that the frame carrying the tracks or ways is adapted to be revolved in the sections and in the circular openings thereof by means of the mechanism described and the carrier or frame is provided with the arm 28 adapted to strike the arms 6, first one then the other to open and close the doors.

In the guides or ways or channels 27 is mounted or movable therein the extended ends 29 of the display frames 30, which consist of the upper and lower pieces 31 made after the manner of a cleat to receive the photograph or other device, and said pieces are connected by the vertical strip 32 which has the ends 29 sliding or movable in said guides, ways or channels 27.

From the foregoing description taken in connection with the drawings the operation of my device will be readily understood and I will state it briefly.

The revolving carriage or frame is filled or loaded with the display frames carrying any object desired for display and the extended ends of the display frames are in the guides or channels of the revolving frame. The shaft is revolved and the frame with devices for display or exhibition is revolved with the frame, and when the last or innermost display frame is brought to the guide strip 13 the ends of said frame are engaged by the strip and separated from the other display frames and the said frame carrying the object for display which is separated is carried by the revolving carriage into the ways 14, then into the ways 16 and presented at the front of the casing and supported in the notches or recesses 17 before the sight opening. Just before the display frame with photograph or other object has been presented the arm on the revolving carriage has struck the arm on one of the doors and opened said doors in order that the doors will be open when the picture is exhibited. After the picture, advertisement, sample or any desired object has been displayed for the proper length of time, the carriage is further revolved and the display frame carried away from the notches or recesses 17 by means of the tracks or strips 26, $26^\times$, by which it is carried into the guide or way 19 back with the other display frames into the guide of the revolving frame, and the operation is repeated a new display-frame being taken into the guide and displayed at the sight opening at each revolution of the carriage and the display-frames have two objects secured therein and both are displayed by the rotation of the carriage as first one side is presented and then the other.

It will be understood that when a holder is left at the front of the casing one side or object thereof is exposed to view. When the carrier completes its revolution, the holder is caused to enter the track-bars and its second side or object faces toward the series of holders already in the carrier. Now after all of the holders have been once displayed, the holder which was first displayed is again carried to the front of the cabinet, and as its second and unexposed side faced toward the rear where it previously entered the track-bars, and as said holder is given a half-turn with the carrier when conveyed to the front, as stated, the second or unexposed side of the holder will be exposed to view when said holder is deposited at the front of the cabinet.

The pivoted bail at the front of the casing serves to support the object when being displayed and permits the frames to be removed when desired by dropping the bail outward.

It will be observed that the frame and revolving carriage are placed on an incline and thereby the weight of gravity of the display frames cause them to fall back or downward and the guide strips are placed at the rear of the frame and receive the extended ends of only one frame at each revolution of the carriage and only one frame can be carried to the front of the casing for display, as is evident.

It will thus be understood that the revolving carriage carries in the guides a series of frames carrying objects for display, that the tendency of the frames by reason of their weight and the inclination of the carriage and frame is to drop or fall back, that the guide strips are arranged at the lowest point in the casing and receive the ends of only one frame and guide it to the front of the casing to the supports, that the doors are opened immediately after the frame with object for display has reached the supporting place by means of the arm striking the arm on one of the doors, that after the object has been displayed the carriage is further revolved and the object carried out of the way and the other arm on the door is struck and both doors closed, and in the meantime another frame is entering the channel or guide to be carried to the front for display, all as clearly shown and described.

I have shown the casing with two doors but I may use only one if I desire and I may have the doors operate differently. I may also have any number of display frames and display any character of objects and I may employ manual or other power.

It will thus be seen that I provide an automatic display device which can be used for displaying any character of objects which could be placed in the display frames, which presents an attractive and ornamental appearance, which can be operated manually or by other power, which can be made of any desired capacity and is compact, and which is durable, efficient and comparatively inexpensive.

I claim as my invention—

1. In a display or exhibiting device, the combination of a casing or housing, a door or doors for controlling the sight opening of the casing, a revoluble carrier in the casing a series of display devices in the carrier, and mechanism operated by the carrier for opening the door or doors and closing same at the proper time, for the purpose described.

2. In a display or exhibiting device, the combination of a casing or housing, a door or doors for the casing or housing, a carriage or carrier mounted in the casing and mechanism for revolving the same, and a series of display frames carrying objects for display and mounted in the carriage, substantially as and for the purpose described.

3. In a display or exhibiting device, the combination of a casing or housing having doors connected by suitable means to open and close, arms secured on the doors, a revolving carriage mounted in the casing and carrying display frames, mechanism for revolving the carriage, and an arm on the carriage adapted to contact with the arms on the doors to first open and then close them, substantially as and for the purpose described.

4. In a display or exhibiting device, the combination of a casing or housing, a stationary frame therein having guides or ways, a carriage mounted and adapted to revolve in the frame, and display frames carried by the carriage and adapted to travel in the guides of the frame, substantially as and for the purpose described.

5. In a display or exhibiting device, the combination of a casing or housing, a stationary frame mounted in the casing at an incline, guides or ways in the said frame, a revolving carriage mounted in the stationary frame, display frames mounted in the carriage and movable therein and adapted to travel one at a time in the guides of the stationary frame, substantially as and for the purpose described.

6. In a display or exhibiting device, the combination of a casing or housing, a stationary frame therein, segmental or arc shaped guides carried by said frame, a revolving carriage mounted in the frame and display frames in the carriage adapted to travel one at a time in the guides of the frame, substantially as and for the purpose described.

7. In a display or exhibiting device, the combination of the casing or housing, having the open front, a door or doors for controlling said opening, a stationary frame in the casing or housing having curved or circular openings, segmental guides within the curved openings of the frame, a carriage revolving in the stationary frame and having guides, a series of display frames carrying display objects and movable in the guides of the carriage and adapted to enter one at a time the segmental guides of the frame and be presented at the front opening of the casing, and means for revolving the carriage and opening and closing the doors, substantially as and for the purpose described.

8. In a display or exhibiting device, the combination of the casing or housing having the opening, the doors mounted therein and having the rollers, the endless band or belt passing around the rollers, the stationary frame in the casing, the supporting bail in rear of the doors, the arms on the doors, the revolving carriage in the frame carrying display frames, the arm carried by the carriage and adapted to contact with the arms on the doors, and mechanism for revolving the carriage, substantially as and for the purpose described.

9. In a display or exhibiting device, the combination of a casing or housing, a stationary frame therein, the rigid and pivoted guide pieces secured to the frame and forming a segmental way or channel, the notches or recesses in the frame forming rests or supports for the display frames, the display frames having the extended ends movable in the segmental way and adapted to rest in the notches or recesses the revolving carriage having guides or ways in which the ends of the frames travel, and mechanism for revolving the carriage, substantially as and for the purpose described.

In testimony whereof I affix my signature in presence of two witnesses.

BENJAMIN J. SMITH.

Witnesses:
W. R. KENNEDY,
WM. N. MOORE.